United States Patent
Teng et al.

(10) Patent No.: US 10,079,642 B2
(45) Date of Patent: Sep. 18, 2018

(54) TRANSPORTING MULTIPLE LOW-SPEED DATA STREAMS ACROSS A HIGH-SPEED COMMUNICATION LINK

(71) Applicant: Renesas Electronics America Inc., Santa Clara, CA (US)

(72) Inventors: Peter Chu Tin Teng, Fremont, CA (US); Senthil K. Krishnamoorthy, Sunnyvale, CA (US)

(73) Assignee: RENESAS ELECTRONICS AMERICA INC., Santa Clara, CA (US)

( * ) Notice: Subject to any disclaimer, the term of this patent is extended or adjusted under 35 U.S.C. 154(b) by 0 days.

(21) Appl. No.: 14/146,444

(22) Filed: Jan. 2, 2014

(65) Prior Publication Data

US 2014/0186054 A1    Jul. 3, 2014

Related U.S. Application Data

(60) Provisional application No. 61/748,204, filed on Jan. 2, 2013.

(51) Int. Cl.
*H04J 14/08*    (2006.01)
*H04B 10/50*    (2013.01)
*H04B 10/25*    (2013.01)

(52) U.S. Cl.
CPC ......... *H04B 10/50* (2013.01); *H04B 10/2503* (2013.01); *H04J 14/08* (2013.01)

(58) Field of Classification Search
USPC .............................................. 398/75, 98–102
See application file for complete search history.

(56) References Cited

U.S. PATENT DOCUMENTS

| | | | |
|---|---|---|---|
| 5,311,344 A * | 5/1994 | Bohn et al. ...................... 398/72 |
| 5,694,232 A * | 12/1997 | Parsay et al. ................... 398/42 |
| 5,809,070 A | 9/1998 | Krisnan et al. ............... 375/222 |
| 6,134,596 A | 10/2000 | Bolosky et al. .............. 709/233 |
| 6,151,336 A * | 11/2000 | Cheng et al. ................. 370/535 |
| 6,226,296 B1 * | 5/2001 | Lindsey et al. ............... 370/401 |
| 6,449,069 B1 * | 9/2002 | Fujita ............................. 398/43 |
| 6,498,667 B1 * | 12/2002 | Masucci ............ H04Q 11/0067 370/230 |
| 6,822,975 B1 * | 11/2004 | Antosik et al. ............... 370/538 |
| 7,428,385 B2 * | 9/2008 | Lee et al. ...................... 398/100 |
| 7,920,791 B2 * | 4/2011 | Sakai et al. ..................... 398/66 |
| 8,009,985 B1 * | 8/2011 | Roberts et al. ................. 398/47 |
| 2001/0010694 A1 * | 8/2001 | Lindsey et al. ............... 370/405 |
| 2005/0100337 A1 * | 5/2005 | DeCusatis et al. ............. 398/75 |
| 2006/0228116 A1 | 10/2006 | Bontu et al. .................. 398/152 |

(Continued)

*Primary Examiner* — Li Liu (74) *Attorney, Agent, or Firm* — Foley & Lardner LLP (57) ABSTRACT

A method and apparatus for transporting multiple low-speed data streams across a high-speed communication channel or link. In one embodiment of the method, first and second data streams are transmitted at first and second data transmission rates, respectively, via an optical cable, wherein the first and second data transmission rates are distinct. Components of the first data stream are transmitted via the optical cable between transmission of components of the second data stream via the optical cable, and components of the second data stream are transmitted via the optical cable between transmission of components of the first data stream via the optical cable.

14 Claims, 5 Drawing Sheets

(56) References Cited

U.S. PATENT DOCUMENTS

| | | | |
|---|---|---|---|
| 2008/0019706 A1* | 1/2008 | Levinson et al. | 398/202 |
| 2008/0056721 A1* | 3/2008 | Mori | H04J 3/1617 |
| | | | 398/100 |
| 2008/0187317 A1* | 8/2008 | Yamabana | 398/98 |
| 2009/0190931 A1* | 7/2009 | Hamano et al. | 398/99 |
| 2009/0196313 A1 | 8/2009 | Ridel et al. | 370/536 |
| 2010/0021173 A1* | 1/2010 | Zhang et al. | 398/98 |
| 2010/0061470 A1* | 3/2010 | Wei | H04Q 11/0062 |
| | | | 375/260 |
| 2012/0020279 A1 | 1/2012 | Kim et al. | 370/315 |
| 2012/0173668 A1 | 7/2012 | Ogata | 709/217 |
| 2012/0189322 A1 | 7/2012 | Mo et al. | 398/188 |

\* cited by examiner

TRANSPORTING MULTIPLE LOW-SPEED DATA STREAMS ACROSS A HIGH-SPEED COMMUNICATION LINK

RELATED APPLICATION

This application claims the domestic benefit under Title 35 of the United States Code § 119(e) of U.S. Provisional Patent Application Ser. No. 61/748,204, filed on Jan. 2, 2013, entitled "Transporting Data From Multiple Low-Bandwidth Interfaces Over A High-Bandwidth Interface," which is hereby incorporated by reference in its entirety and for all purposes as if completely and fully set forth herein.

BACKGROUND

Communication links transmit data between devices such as computers, printers, routers, switches, hubs, storage devices, cameras, etc. Communication links transmit data in accordance with well known protocols such as those employed in Universal Serial Bus (USB), Ethernet, HDMI, etc. Protocols define a set of rules for transmitting data in formatted units such as packets, frames, etc. Some protocols enable devices to transmit data at a faster rate than other protocols.

Communication links differ in structure. For example, an electrical communication link (hereinafter electrical link) includes one or more copper wires to transmit data in electrical signal form. An optical communication link (hereinafter optical link) an optical cable consisting of one or more optical fibers to transmit data in optical signal form. The present invention will be described with reference to an optical communication link (hereinafter optical link) that transmits data in optical signal form over an optical cable consisting of one or more optical fibers, it being understood the present invention can be employed with other types of communication links such wireless communication links.

Optical links can provide substantial benefits over electrical links. For example, optical fibers of optical links are light weight when compared to copper wires of electrical links. Optical fibers are not subject to EMI interference from nearby electrical devices, and optical fibers do not generate EMI interface that may adversely affect nearby electrical devices. Data can be transmitted farther over optical fibers without attenuation when compared to data transmission over copper wires. Also, optical fibers are capable of transmitting data at very high rates. For example, optical fibers can transmit data at 60 Gb/s.

SUMMARY OF THE INVENTION

A method and apparatus for transporting multiple low-speed data streams across a high-speed communication channel or link. In one embodiment of the method, first and second data streams are transmitted at first and second data transmission rates, respectively, via an optical cable, wherein the first and second data transmission rates are distinct. Components of the first data stream are transmitted via the optical cable between transmission of components of the second data stream via the optical cable, and components of the second data stream are transmitted via the optical cable between transmissions of components of the first data stream via the optical cable.

BRIEF DESCRIPTION OF THE DRAWINGS

The present invention may be better understood in its numerous objects, features, and advantages made apparent to those skilled in the art by referencing the accompanying drawings.

The use of the same reference symbols in different drawings indicates similar or identical items.

DETAILED DESCRIPTION

An apparatus and method is disclosed for aggregating low-speed data streams into a high-speed data stream for transmission across an optical cable. Once transmitted across the optical cable, the high-speed data stream can be partitioned into its constituent low-speed data streams for continued transmission to respective destination devices. The low-speed data streams can be aggregated, transmitted across the optical cable, partitioned, and transmitted to their respective devices even though the low-speed streams are asynchronous with respect to each other.

An apparatus and method is disclosed for dynamically adjusting the data transmission rate of the high-speed data stream. In one embodiment, the data transmission rate can be set based on the number of low-speed data streams that are aggregated into the high-speed data stream. For example, the data transmission rate of the high-speed data stream can be increased to accommodate a newly aggregated low-speed data stream. The increase of data transmission rate can ensure that the low-speed data streams can be aggregated and transmitted across the optical cable without violating latency requirements of the protocols under which the respective low-speed data streams operate. In order to conserve power consumption while maintaining protocol latency requirements, the data transmission rate of the high-speed data stream can be reduced when one of the low-speed data streams is de-aggregated from the high-speed data stream.

An apparatus and method is disclosed for adjusting the bandwidth of the high-speed data stream that is allocated to a low-speed data stream in order to adjust the transmission latency of the low-speed data stream without adjusting the bandwidth of the high-speed data stream that is allocated to another low-speed data stream.

Figure 1:
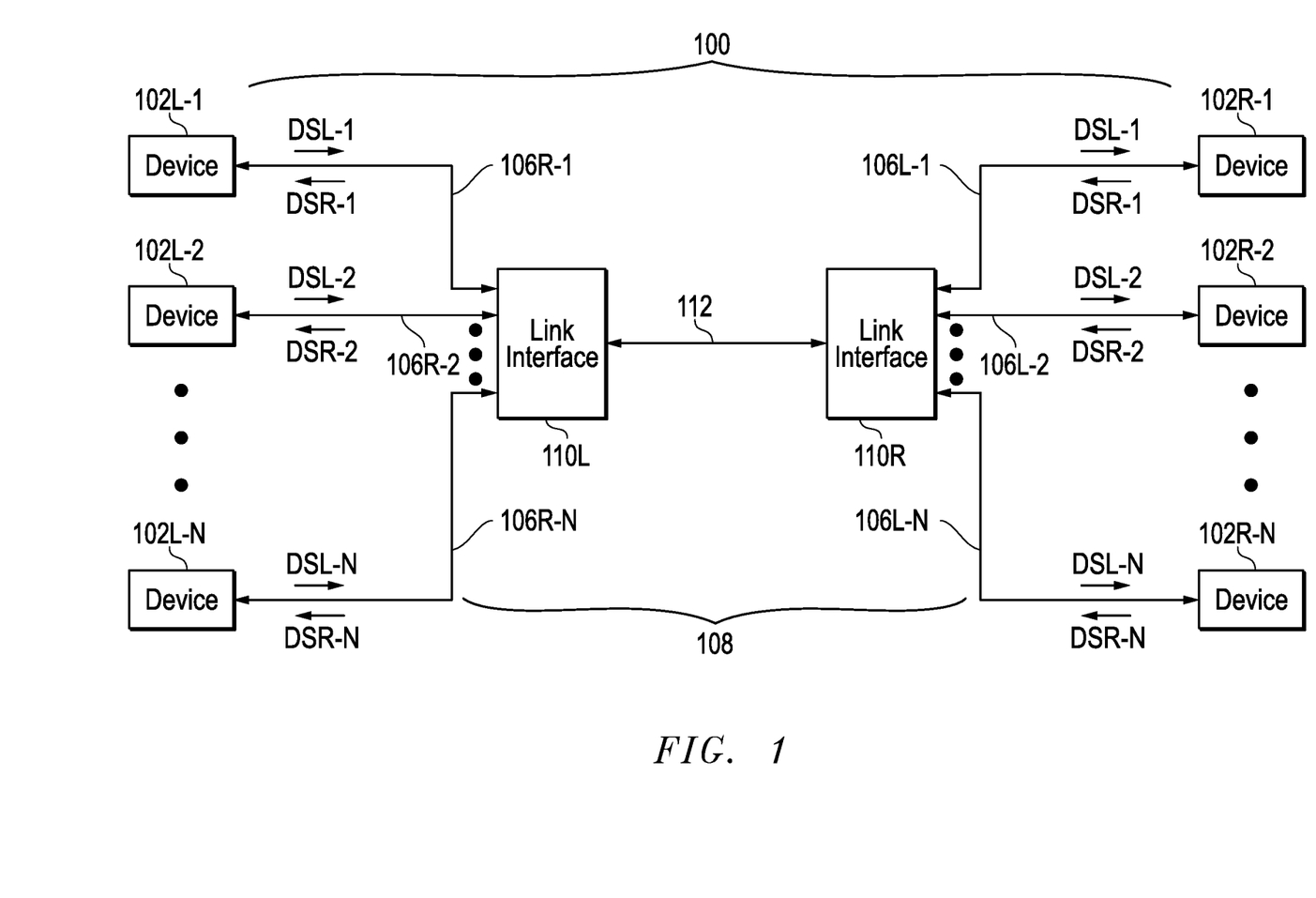
FIG. 1 is a block diagram illustrating an example communication system employing one embodiment of the present invention.

FIG. 1 illustrates, in block diagram form, a communication system 100 employing an example embodiment of the present invention. While the present invention will be described with reference to FIG. 1, the present invention should not be limited thereto.

Devices 102L-1-102L-N are coupled to and configured to exchange data with devices 102R-1-102R-N, respectively, via communication system 100. Devices 102L-1-102L-N and 102R-1-102R-N may take form in computers, printers, digital cameras, switches, data storage devices, televisions. USB hubs, USB hosts, etc.

Communication system 100 includes an optical link 108 coupled between copper wires 106L-1-106L-N and 106R-1-106R-N as shown. Optical link 108 includes an optical cable 112 coupled between link interfaces 110L and 110R.

Devices 102L-1-102L-N can transmit low-speed data streams DSL-1-DSL-N, respectively, to link interface 110L via copper wires 106L-1-106L-N, respectively. Link interface 110L can aggregate low-speed data streams DSL-1-DSL-N into a high-speed data stream for transmission to link interface 110R via optical cable 112. Link interface 110R can partition the high-speed data stream it receives into the low-speed data streams DSL-1-DSL-N. Link interface 110R can then forward the low-speed data streams DSL-1-DSL-N to devices 102R-1-102R-N, respectively, via copper wires 106R-1-106R-N, respectively.

Low-speed data streams can flow in the reverse direction in similar fashion. Devices 102R-1-102R-N can transmit low-speed data streams DSR-1-DSR-N, respectively, to link interface 110R via copper wires 106R-1-106R-N, respectively. Link interface 110R can aggregate low-speed data streams DSR-1-DSR-N into a high-speed data stream for transmission to link interface 110L over optical cable 112. Link interface 110L can partition the high-speed data stream it receives into the low-speed data streams DSR-1-DSR-N. Link interface 110L can then forward the low-speed data streams DSR-1-DSR-N to devices 102L-1-102L-N, respectively, via copper wires 106R-1-106R-N, respectively.

Optical link 108 can operate at full duplex. In other words the high-speed data stream noted above can be transmitted from link interface 110L to link interface 110R, while the high-speed data stream noted above is transmitted from link interface 110R to link interface 110L. The present invention will be described with reference to aggregation of one or more active low-speed data streams DSL-1-DSL-N into a high-speed data stream for transmission from link interface 110L to link interface 110R as described above, it being understood the present invention should not be limited thereto. The present invention will also be described with reference to optical cable 112 and copper wires 106 transmitting data in serial format, it being understood the present invention should not be limited thereto.

Active low-speed data streams DSL-1-DSL-N transmit data in accordance with distinct communication protocols that have different signaling, link layers and speed. Devices 102L-1 and 102R-1 communicate with each other using protocols embodied in USB 2.0, devices 102L-2 and 102R-2 communicate with each other using protocols embodied in USB 3.0, devices 102L-3 and 102R-3 communicate with each other using protocols embodied in HDMI, etc. As such copper wires 106L-1 and 106R-1 transmit data streams at 1.5 Mb/s, 12 Mb/s, or 480 Mb/s in accordance with USB 2.0, copper wires 106L-2 and 106R-2 transmit data streams at 5.0 Gb/s in accordance with USB 3.0, etc. For ease of illustration only, it will be presumed that all active low-speed data streams DSL-1-DSL-N transmit data, including control data, in formatted packets.

Optical link 108 employs a unified data and control transfer mechanism that enables low-speed data stream aggregation and communication between devices 102L-1-102L-N and 102R-1-102R-N, respectively, as will be more fully described below. Optical cable 112 transmits data in optical signal form at substantially higher rates (e.g., 60 Gb/s) over optical cable 112 when compared to copper wires 106L-1-106L-N. The data transmission rate of the optical cable 112 can be dynamically adjusted. The rate should always be high enough that optical link 108 adds very little latency to the low-speed data streams transmitted between devices 102L-1-102L-N and 102R-1-102R-N, respectively. Because the added latency is low, each device pair 102L-x and 102R-x can communicate with each other without violating the latency requirements of the protocols under which they operate. In other words, devices 102L-x and 102R-x can communicate with each other without being aware of intervening optical link 108.

Link interface 110L may concurrently receive one or more active low-speed data streams DSL-1-DSL-N from multiple devices 102L-1-102L-N, respectively. Low-speed data streams DSL-1-DSL-N received by link interface 110L may be asynchronous with respect to each other. Two data streams are asynchronous with each other when there is no transmission timing requirement between them (e.g., each device 102L-1 and 102L-2 may begin transmitting a respective packet at the same point in time). The asynchronous low-speed data streams received by link interface 110L can be aggregated into the high-speed data stream for transmission over cable 112 to interface link R without data collision that would otherwise occur when asynchronous data streams DSL-1-DSL-N are aggregated for transmission.

Optical link 108 can adjust the latency it adds to low-speed data streams that are aggregated for transmission across optical cable 112. Latency can be adjusted by adjusting the bandwidth of the high-speed data stream that is allocated to the low-speed data streams. Latency adjustments can be performed individually or collectively. For example, link interfaces 110 can increase the bandwidth allocated to active DSL-1 in order to reduce the latency of DSL-1 across optical link 108, while maintaining the latency of other active low-speed data streams aggregated into the high-speed data stream.

The high-speed data stream transmitted across optical cable 112 consists of data words, control words, delimiters, etc. The data words in the high-speed data stream are encoded portions of low-speed data streams DSL-1-DSL-N. The control words are encoded portions of control packets CP generated and sent by link interface 110L or link interface 110R. Delimiters and nulls are more fully described below.

Link interface 110L can divide a packet Pz-x of any active low-speed data stream DSL-x into Mz multibit data words, where Mz depends on the size of the packet Pz-x being divided, and z designates the packet number in the data stream. The present invention will be described with reference to link interface 110L dividing data packets of the low-speed data streams into 8-bit data words, it being understood the present invention should not be limited thereto.

Link interfaces 110L and 110R can generate and exchange control packets (CP) and high-speed data stream delimiters. Control packets CP are fixed in size (e.g., 32 bits including a start delimiter). Delimiters are also fixed in size (e.g., 8 bits).

Control packets CP contain link state and parameter information used by link interfaces 110L and 110R to control operational aspects of optical link 108 including: the data transmission rate of the high-speed data stream; allocation of bandwidth of the high-speed data stream to low-speed data stream components thereof; identity of low-speed data streams aggregated into the high-speed data stream; gap G-x and interval I-x of data words for low-speed data stream DSL-x as will be more fully described; etc. Link interfaces 110L, and 110R can adjust operational aspects of link 108 using link state and parameter information exchanged via control packets CP. For example, link interfaces 110L and 110R can generate and exchange control packets CP that result in the increase or decrease of the rate at which the high-speed data stream is transmitted across optical link 108. Link interfaces 110 may generate and exchange control packets CP that result in the increase or decrease of the latency at which data of one or more of aggregated low-speed data streams are transmitted across optical link 108. Link interfaces 110 may generate and exchange control packets CP that result in the increase or decrease of the number of low-speed data streams that are aggregated for transmission over optical cable 112. Additional control packets CP, such as acknowledge control packets, are contemplated. The control packets CP are fixed in size in one embodiment of the present invention.

Link interface 110L can divide data packets as they are being serially received. Link interface 110L can divide multiple data packets from respective low-speed data streams in parallel as they are being received. Link interface 110L can divide control packets CP it generates into four 8-bit control words including the control packet start delimiter. Link interfaces 110L and 110R can generate and transmit high-speed data stream delimiters, which identify the start and end of data within the high-speed data stream as more fully described below. Delimiters generated by link interface 110L are 8-bits in length. The present invention can be employed with data words, control words, and delimiters having a length other than 8-bits.

Link interface 110L includes a data encoder such as an 8-bit/10-bit encoder. Using the 8-bit/10-bit encoder, the link interface 110L can encode 8-bit data words, 8-bit control words, and 8-bit delimiters into encoded 10-bit data words, encoded 10-bit control words, and encoded 10-bit delimiters before transmission to link interface 110R via the high-speed data stream and cable 112. The encoded 10-bit data words, encoded 10-bit control words, and encoded 10-bit delimiters enable interfaces 110L and 110R to synchronize their respective clocks. Importantly, headers or other information are not added to encoded 10-bit data words before they are transmitted to link interface 110R. Thus, encoded 10-bit data words lack added information (e.g., an address or other identifier) that identifies a related device 102L-x or low-speed data stream DSL-x.

Link interface 110R includes a decoder such as an 10-bit/8-bit decoder that decodes the 10-bit data words, 10-bit control words, and 10-bit delimiters back into the 8-bit data words, 8-bit control words, and 8-bit delimiters, respectively. Link interface 110R can concatenate 8-bit data words to reconstruct data packets for subsequent transmission. Link interface 110R may transmit a portion of a data packet to a destination device 102R as the data packet is being reconstructed by link interface 110R. Further, link interface 110L can reconstruct several data packets in parallel. Link interface 110R can also concatenate control words to reconstruct control packets CP before processing the link state and parameter information contained therein to adjust operating characteristics of optical link 108. For ease of illustration and description, the remaining description will not make a distinction, except where noted, between: 8-bit data words and corresponding encoded 10-bit data words; 8-bit control words and corresponding encoded 10-bit control words, and; 8-bit delimiters and corresponding encoded 10-bit delimiters. It is understood that optical cable 112 transmits the high-speed data stream consisting of encoded 10-bit data words, encoded 10-bit control words, and encoded 10-bit delimiters.

Link interface 110L includes a scheduling circuit that may take form in instructions executing on a processor. Using an updateable schedule stored in memory, the scheduling circuit in link interface 110L can schedule the transmission of Mz-x data words between transmission of delimiters Start-x and End to link interface 110R via the high-speed data stream. Start-x is unique to the low-speed data stream DSL-x, while End can be used for any of the low-speed data streams DSL-1-DSL-N. Link interface 110R also includes a scheduling circuit that may take form in instructions executing on a processor. Using an updateable schedule stored in its memory, the scheduling circuit in link interface 110R can anticipate the receipt of the Mz-x data words between receipt of delimiters Start-x and End via the high-speed data stream.

The Mz-x data words need not be immediately transmitted one after another. A predefined initial time gap G-x may occur between the transmission of Start-x and the transmission of the first data word of the Mz-x data words. Further, the transmission of the remaining Mz-x-1 data words and End should occur at predefined intervals I-x after transmission of the first data word. To reduce low-speed data stream DSL-x latency without modifying the latency of other low-speed data streams, the first data word of the Mz-x data words may be transmitted after the Start-x delimiter with a reduced or no time gap (i.e., G-x=0), and/or the remaining Mz-x-1 data words may be transmitted with a reduced interval I-x. As more fully described below, link interface 110L can schedule the transmission of data words for other low-speed data streams, null words, and/or control words in the time gap G-x and/or in the intervals I-x between transmission of the Mz-x data words and End. Link interface 110R on the other hand can anticipate the arrival of data words for other low-speed data streams, null words, and/or control words in the time gap G-x and/or in the intervals I-x between receipt of the Mz-x data words and End.

Link interlace 110L can generate and send control packets to link interface 110R that contains initial or updated values for gap G-x and/or interval I-x for each active low-speed data stream. Link interfaces 110L and 110R can store the values for gap G-x and interval I-in memory. Values of gap G-x and interval I-x can be expressed as units of time slots of the high-speed data stream. A data word, control word, null or delimiter can be transmitted during a time slot. Link interfaces 110L and 110R can use the gap and interval values for active low-speed data streams DSL-1-DSL-N to create or modify the schedules for transmitting or receiving, respectively, the data words, control words, and/or delimiters. The scheduling circuit within link interface 110L can use its schedule to determine when data words, control words, nulls and/or delimiters are to be transmitted to link interface 110R, and the scheduling circuit link in interface 110R uses its schedule to anticipate when it will receive data words, control words, and/or delimiters from link interface 110L via the high-speed data stream. The gap and interval values, and thus the schedules held by link interface 110L and link interface 110R can be updated during operation of optical link 108 via the exchange of control packets.

Link interface 110R can recognize and distinguish between different Start-x it receives via the high-speed data stream. After link interface 110R detects the receipt of Start-x, link interface 110R can use the schedule it has to anticipate when it will receive the Mz-x data words and/or End delimiter. Thus link interface 110R can intelligently separate out the Mz-x data words from data words or Start delimiters for other low-speed data streams, control words, and nulls. In one embodiment, the start delimiter Start-C is unique to all control packets. Because control packets are fixed in length, the End delimiter is not used to identify the last control word of the control packet.

As noted, link interface 110L may transmit additional data words of low-speed data streams other than DSL-x, control words, etc., between transmission of Start-x, the Mz-x data words and End. The transmission of the additional data words between the transmission of Start-x, the Mz-x data words, and End, illustrates the result of aggregating multiple low-speed data streams for transmission across cable 12 in the high-speed data stream. Link interface 110L schedules the transmission of the additional data words to enable link interface 110R to anticipate when it will receive data words for low-speed data streams other than DSL-x.

Figure 2:
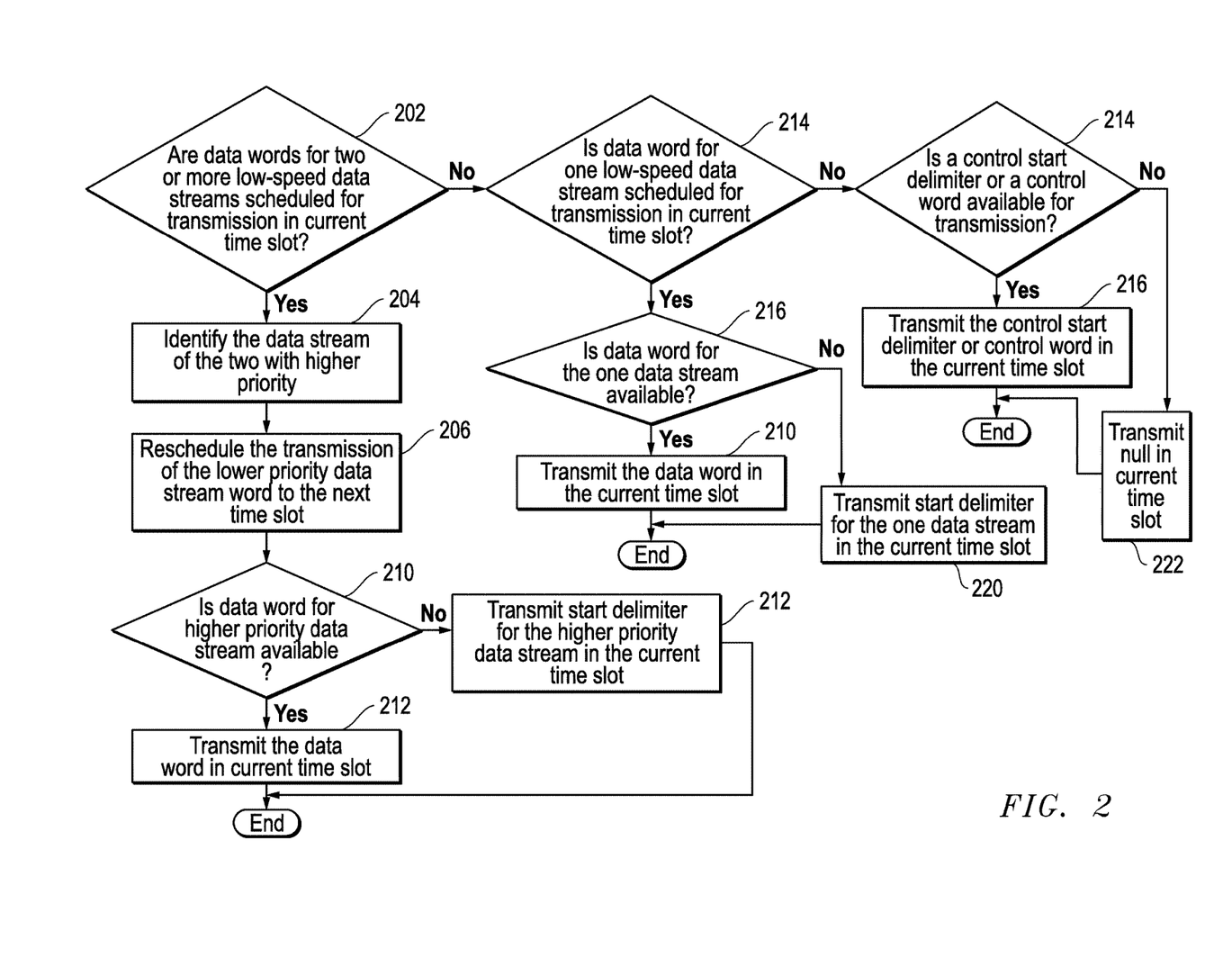
FIG. 2 is a flow chart illustrating certain aspects of aggregating data streams in accordance with one embodiment of the present invention.

FIG. 2 illustrates relevant aspects of an example scheduling process employed by the scheduling circuit of link interface 110L in accordance with one embodiment of the present invention. The process shown in FIG. 2 begins when link interface 110L is ready to transmit a data word, control word, delimiter, or null during the current time slot within the high-speed data stream.

At step 202, link interface 110L determines whether there are data words for two active low-speed data streams that are scheduled for transmission in the current time slot. This condition can occur when two low-speed data streams are asynchronous with respect to each other, thus resulting in two data words for the data streams being scheduled for transmission by link interface 110L in the same time slot. The link interface 110L uses its schedule, which is calculated based upon the gaps G and intervals I for the two active low-speed data streams, to identify the double scheduling. If link interface 110L determines that there are two data words scheduled for transmission, link interface 110L identifies the low-speed data stream of the two that has the higher priority. In one embodiment, the priorities for the active low-speed data streams are stored in memory and updated as low-speed data streams are added to or deleted from the high-speed data stream. Once the higher priority data streams is identified, the process proceeds to step 206 where link interface 110L reschedules the transmission of the lower priority data stream word to the next consecutive time slot within the high-speed data stream. Thereafter, link interface 110L determines whether a data word for the higher priority data stream is available to be transmitted to link interface 110R. If it is, link interface 110L transmits the data word in the current time slot as shown in step 212. It is possible for any one of a number of different reasons that the data word for the higher priority data stream is not yet available. In this situation, link interface 110L transmits a start delimiter for the higher priority data stream in the current time slot.

Link interface 110L determines whether there are two data words scheduled for transmission in the same time slot as shown in step 202. If link interface 110L determines that there is no contention between two low-speed data streams for the current time slot, the process proceeds to step 214 where link interface 110L determines whether a data word for one and only one low-speed data stream is scheduled for transmission. If the condition shown in 214 is satisfied, link interface 110L determines whether the data words for the one low-speed data streams is available for transmission. If it is, link interface 110L transmits the data word in the current time slot of the high-speed data streams. If the data word is not available for transmission, then link interface 110L transmits a start delimiter for the one low-speed data stream as shown in step 220.

Often times, no data words are scheduled to be transmitted for a time slot in the high-speed data stream. In this situation, as shown in step 214, link interface 110L will determine whether a control start delimiter or a control words is available for transmission. In one embodiment, interface link 110L can make this determination by determining whether a control packet has been generated but has yet to be fully divided and transmitted to link interface 110R as control words. If a control start delimiter and/or a control word for a previously generated control packet CP is available for transmission, link interface 110L transmits the control strat delimiter or control word in the current time slot as shown in step 126. Otherwise, link interface 110L transmits a null in the current time slot as shown in step 222. It is noted in an alternative embodiment, that link interface 110L can regenerate the most recently transmitted control packet if a control start delimiter or control word for a prior control packet is not available for transmission to link interface 110R. In this embodiment, there will always be a control start delimiter and/or control word available for transmission in step 214.

Figure 3:
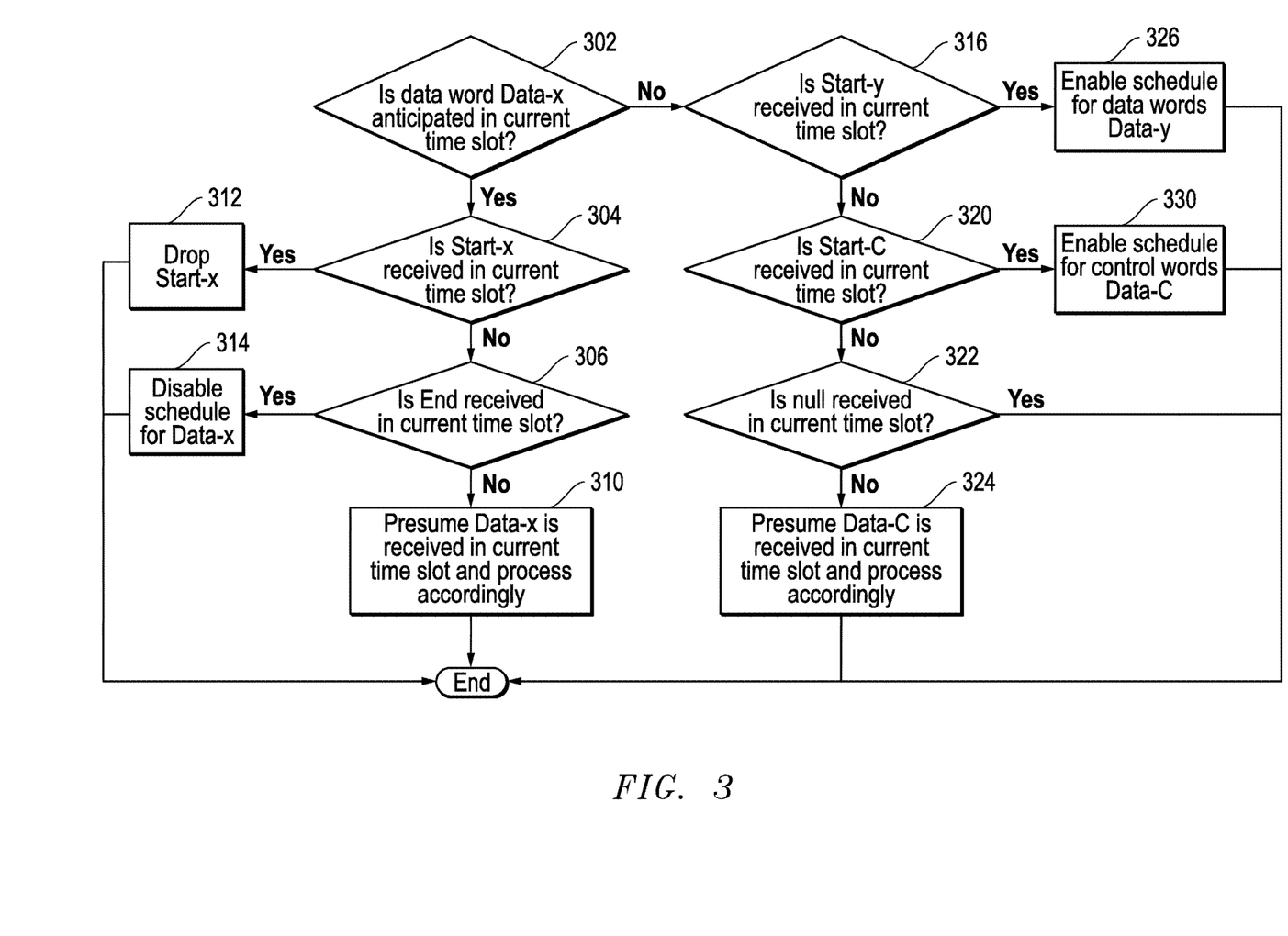
FIG. 3 is a flow chart illustrating certain aspects of de-aggregating data streams in accordance with one embodiment of the present invention.

As noted above, link interface 110R anticipates the arrival of data words or control words from link interface 110L via the high-speed data stream using its schedule in memory. FIG. 3 illustrates relevant aspects of an example process employed by the scheduling circuit of link interface 110R according to one embodiment of the present invention. The process in FIG. 3 begins when link interface 110R receives data from link interface 110R in a time slot of high-speed data stream. In step 302, link interface 110R accesses its schedule to determine whether data word Data-x of the low-speed data stream DSL-X is expected or anticipated in the time slot. If Data-x is anticipated, then in step 304 link interface 110R determines whether the data received in the current time slot is a Start-x delimiter. If the data received is a Start-x delimiter, link interface 110R knows that link interface 110L did not have data word Data-x available for transmission during the current time slot, and in response link interface 110L transmitted the Start-x delimiter in its place. If however, link interface 110R determines that the data received in the current time slot is not a Start-x delimiter, the process proceeds to step 306 where link interface 110R determines whether an End delimiter is received in the current time slot as shown in step 306. The end delimiter denotes the end of the Mz-x data words for the low-speed data stream in consideration. If link interface 110R determines that an End delimiter is not received then the process proceeds to step 310 where link interface 110R presumes that data word Data-x was in fact received in the current time slot and processes the data accordingly as set forth above.

In step 304, link interface 110R determines whether a Start-x is received in the current time slot. If link interface 110R determines that a Start-x delimiter is in fact received, that delimiter is dropped in step 312. In step 306, link interface 110R determines whether an End delimiter is received in the current time slot. If an end delimiter is in fact received, the scheduling circuit within link interface 110R updates the schedule to indicate that no additional data words Data-x should be expected in the future from link interface 110L. In this manner, link interface 110R disables the schedule for Data-x as shown in Step 314.

In step 302, link interface 110R uses its schedule to determine whether a data word Data-x is anticipated in the time slot. If link interface 110R determines that data word Data-x is not anticipated, link interface 110 determines in step 316 whether a Start-y delimiter was received in the current time slot. If a Start-y delimiter was received, the scheduling circuit within link interface 110R updates the schedule as shown in step 326. Specifically, the schedule is updated to indicate that data words Data-y should be anticipated in the future in time slots designated by gap G-Y and interval R-Y, which should be stored in memory in response to link interface 110R receiving a control packet containing these values. If a Start-y delimiter is not received in the current time slot, the process proceeds to 320 where link interface 110R determines whether a Start-C delimiter is received in the current time slot. The Start-C delimiter designates the start of a new control packet. If a Start-C is determined to be received in the current time slot, then link interface 110R updates its schedule to account for control words Data-C that will arrive in future time slots. In other words, in step 330, link interface 110R enables the schedule for control words Data-C. If a Start-C is not recognized in step 320, link interface 110R determines whether a null was received in the current time slot as shown in step 322. If a null packet was recognized, it is ignored. Otherwise, as shown in step 324, link interface 110R presumes that a control word Data-C is received in the current time slot and this control word Data-C is processed accordingly. For example, the Data-C control word can be concatenated with other control words for the control packet. If the Data-C control word received in 324 is the final control word for the control packet in consideration, the control packet is processed by link interface 110R. For example, link interface 110R can generate an acknowledgment control packet for such transmission back to link interface 110L; moreover, link interface 110R can, for example, increase the transmission rate of the high-speed data stream in accordance with an instruction contained within the control packet.

FIGS. 4A-4G illustrate graphical representations of example high-speed data streams transmitted from link interface 110L to link interface 110R via optical cable. Each example high-speed data stream illustrates successive 10-bit time slots during which link interface 110L serially transmits respective 10-bit data words, control words, delimiters, or nulls.

Figure 4A:
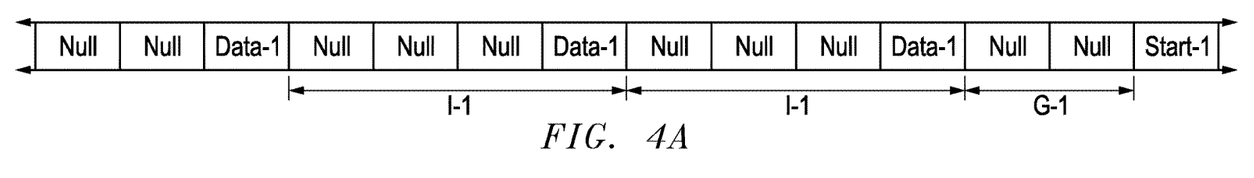
FIGS. 4A-4D illustrate example high-speed data streams.

FIG. 4A illustrates an example high-speed data stream into which low-speed data stream DSL-1 has been aggregated. Before link interface 110L begins transmitting data words Data-1 for DSL-1, link interface 110L generates and sends a control packet to link interface 110R indicating that link interface 110L will be sending data words for DSL-1 in the near future. This control packet may include gap G-1 and interval I-1. Additionally, the control packet may contain an updated data rate at which link interface 110L will send words or delimiters via the high-speed data stream. Other link state and parameter information may be included in the control packet. The control packet is transmitted to link interface 110R in a set number of control words including Start-C, the start delimiter for all control packets. If link interface 110L does not receive a control packet acknowledgment from link interface 110R within a predetermined amount of time, link interface 110L will resend the control packet to link interface 110R.

After link interface 110L receives the acknowledgment control packet, link interface 110L transmits Start-1 in an unassigned time slot (i.e., a time slot in which a data word for another low-speed data stream is scheduled to be transmitted). Link interface 110R receives and recognizes Start-1. Using gap G-1 stored in memory, link interface 110R updates its schedule to anticipate that it will receive the first data word Data-1 in the time slot after gap G-1. Thereafter, link interface 110R anticipates it will receive subsequent data words Data-1 or End after time intervals I-1 as shown within FIG. 4A. Time slots between Start-1, Data-1, and End can be filled with additional words, delimiters or nulls by link interface 110L.

Figure 4B:
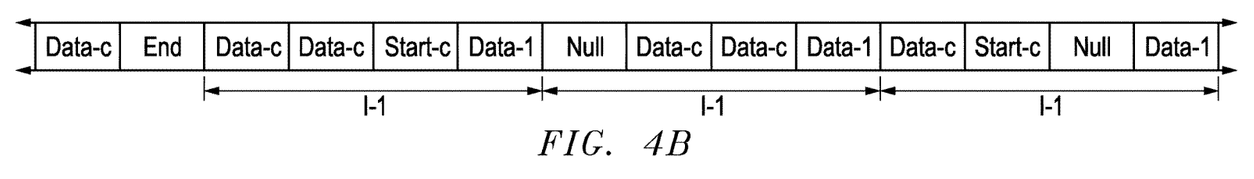

FIG. 4B shows the high-speed data stream of FIG. 4A with an End delimiter inserted for low-speed data stream DSL-1. The End delimiter is transmitted in a time slot that occurs within the interval I-1 after the last data word Data-1 is transmitted. When the End delimiter is received, link interface 110R will not expect additional data words Data-1 for low-speed data stream DSL-1 until link interface 110R receives a subsequent Start-1 indicating that link interface 110L will once again send data words for DSL-1. It is noted that a subsequent control packet may change the values for G-1 and/or I-1 in order to adjust, for example, the transmission latency for low-speed data stream DSL-1.

As noted above, the high-speed data stream transmitted from link interface 110L to link interface 110R may include control words interspersed between data words such as Data-1. FIG. 4B illustrates control start delimiter Start-C and control words Data-C for a control packet interspersed in the high-speed data stream. In one embodiment, each control packet generated by link 110L is divided into 8-bit portions, including the control start delimiter. Link interface 110L will transmit the start delimiter Start-C for the control packet. FIG. 4B illustrates Start-C inserted into the high-speed data stream by link interface 110L in between a pair of data words Data-1. If link interface 110R does not anticipate receiving a data word during a particular time slot, link interface 110R will determine whether the time slot contains a start delimiter or null. When link interface 110R receives Start-C, link interface 110R can anticipate that it will receive control words in time slots that are not scheduled to include data words. Once link interface 110R receives the control words for the control packet, link interface 110R can process the data contained therein for example, by updating gap and interval values stored in memory, and updating the schedule for receiving data words.

Figure 4C:
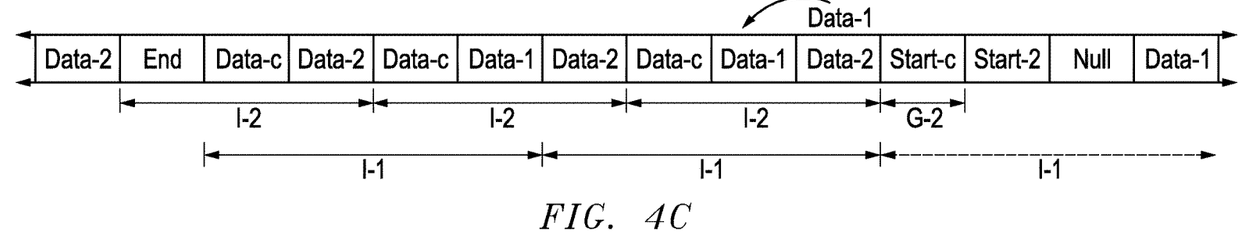
Figure 4D:
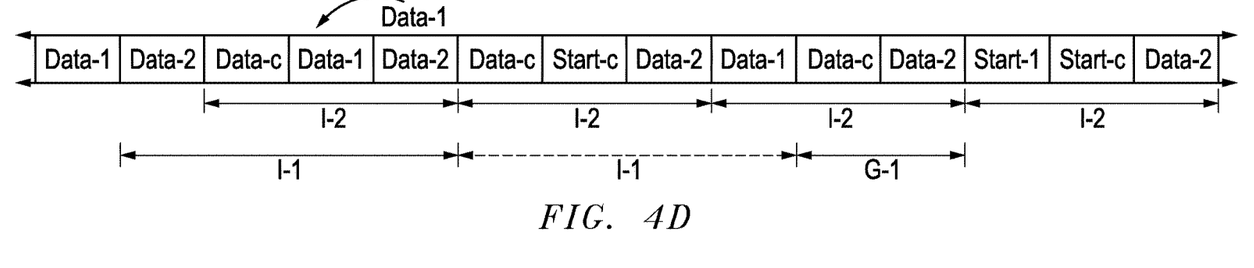

The high-speed data stream can aggregate two or more low-speed data streams that are asynchronous with respect to each other. In this situation, link interfaces 110L and 110R assign priority to the low-speed data streams. When data words for separate low-data streams are scheduled to be transmitted during the same time slots of the high-speed data stream, link interface 110 will transmit the data word for the high priority data stream, and transmit the data word for the lower priority data stream during the next available time slot. FIG. 3C illustrates a high-speed data stream in which this aspect in shown. In FIG. 3C, data words Data-1 and Data-2 for DSL-1 and DSL-2, respectively, are scheduled for transmission during the same time slot. Recognizing the collision based on its schedule, link interface 110L transmits Data-2 since DSL-2 is assigned a higher priority over low-speed data stream DSL-1. By virtue of exchange of control packets between link interfaces 110L and 110R, link interfaces 110L and 110R have identical lists that prioritize the low-speed data streams DSL-1 thru DSL-N. If any of these low-speed data streams are active within the high-speed data stream, link interfaces 110L and 110R can resolve a collision as set forth above using the priority list. It is noted that in FIG. 4C, Data-2 is shown in a time slot that would otherwise be reserved for transmission of Data-1. However, given the scheduling conflict, FIG. 4C shows that Data-1 is transmitted in the next available time slot that is not designated for a data word. FIG. 4D illustrates an example high-speed data stream in which control words that would've otherwise been transmitted in respective time slots, have been displaced by transmission of delimiter Start-1 and Data-1 in accordance with the process shown in FIG. 2.

Figure 5:
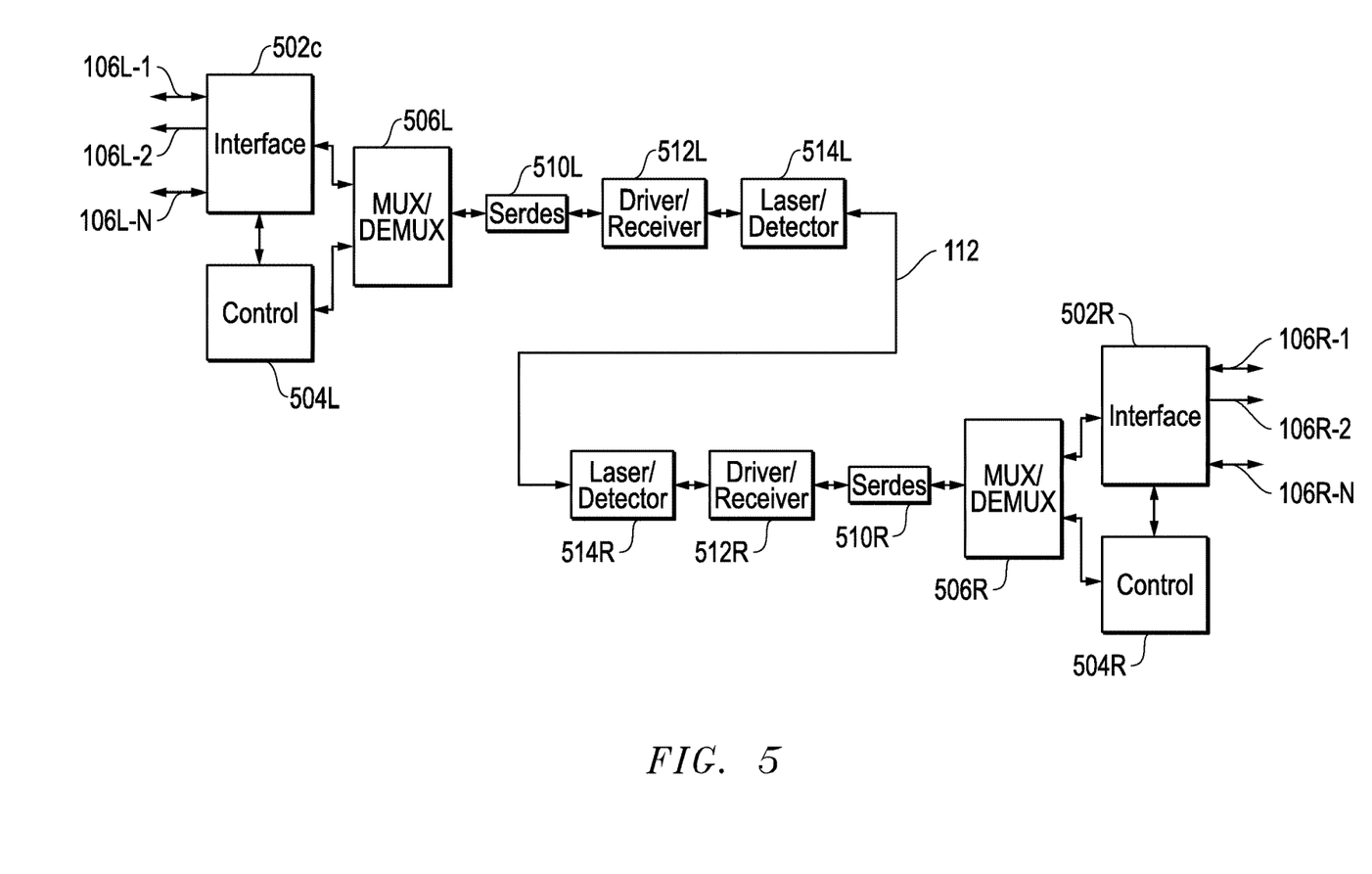
FIG. 5 is a block diagram illustrating an example embodiment link employed in FIG. 1.

FIG. 5 illustrates in block diagram form one example of the optical link 108 shown within FIG. 1. Many components of link interfaces 110 shown in FIG. 5 may take form in hardware, software, or a combination of hardware and software. When implemented in software, a component may take form in instructions executing on a processor core of a microcontroller. The instructions can be stored in memory of the microcontroller.

Interface 502L is coupled to copper wires 106L-1-106L-N. Interface 502L and control circuit 504L are coupled to multiplexor/demultiplexor (mux/demux) 506L. Interface 502R is coupled to copper wires 106R-1-106R-N. Interface 502R and control circuit 504R are coupled to mux/demux 506R. Mux/demux 506L is controlled by control circuit 504R, while mux/demux 506R is controlled by control circuit 504R. Although not shown in FIG. 5, interface 502L includes an optical interface coupled between mux/demux 506L and electrical packet interfaces, which in turn are coupled to receive respective low-speed data streams DSL1-DSL-N, and, interface 502R includes an optical interface coupled between mux/demux 506R and electrical packet interfaces, which in turn are coupled to receive respective low-speed data streams DSR1-DSR-N. Each electrical packet interfaces is configured to operate in accordance with a respective protocol (e.g., USB 2.0) and may include supporting circuitry for that purpose such as clock data recovery (CDR) circuits, data samplers, buffers, etc.

Serializer/deserializer (serdes) 210L is coupled between driver/receiver 212L and mux/demux 506L, while serdes 210R is coupled between driver/receiver 212R and mux/demux 506R. Driver/receivers 212L and 212R are coupled to laser/detector 214L and laser/detector 214R, respectively, as shown with optical cable 112 therebetween. The combination of driver and laser at one end of cable 112 serially receives signals in electrical signal form, and converts them into optical signal form for transmission over optical cable 112. The combination of light detector and receiver at the other end of cable 112 serially receives signals in optical signal form, and converts them into electrical signal form.

Serdes 210L is configured to receive 10-bit words (more fully described below) from mux/demux 506L in parallel and form, and convert them into 10-bit words in serial form for subsequent transmission to driver/receiver 212L. Or serdes 210L is configured to receive 10-bit words in serial form, and convert them into 10-bit words in parallel form for subsequent transmission to mux/demx 506L. Serdes 210R is configured to receive 10-bit word from mux/demux 506R in parallel form, and convert them into 10-bit words in serial form for subsequent transmission to driver/receiver 212R. Or serdes 210R is configured to receive 10-bit words in serial form, and convert them into 10-bit words in parallel form for subsequent transmission to mux/demux 506R.

Although the present invention has been described in connection with several embodiments, the invention is not intended to be limited to the specific forms set forth herein. On the contrary, it is intended to cover such alternatives, modifications, and equivalents as can be reasonably included within the scope of the invention as defined by the appended claims.

What is claimed is:

1. A method comprising:
    receiving first and second data streams at first and second data rates, respectively, wherein the first and second data rates are distinct;
    creating first data words of N bits from data of the first data stream;
    creating second data words of N bits from data of the second data stream;
    transmitting the first data words at time intervals I-1;
    transmitting the second data words at time intervals I-2;
    wherein time interval I-1 is greater than time interval I-2;
    wherein at least one of the first data words is transmitted via an optical cable between transmission of a pair of the second data words via the optical cable, and;
    wherein at least one of the second data words is transmitted via the optical cable between transmission of a pair of the first data words via the optical cable.

2. The method of claim 1 further comprising:
    receiving a third data stream;
    creating third data words of N bits from data of the third data stream;
    transmitting the third data words via the optical cable;
    wherein at least one of the third data words is transmitted between transmission of another pair of the first data words;
    wherein at least one of the first data words is transmitted between transmission of a pair of the third words.

3. The method of claim 2 wherein the third data stream is received at the second data rate.

4. The method of claim 1 wherein the first and second data streams are received from first and second devices, respectively, that transmit the first and second data streams in accordance with first and second protocols, respectively, wherein the first and second protocols are distinct.

5. The method of claim 1 further comprising mapping N bits of the first data stream to M bits using an encoder, and transmitting the M bits via the optical cable as one of the first data words.

6. The method of claim 1 wherein the first and second data streams are asynchronous with respect to each other.

7. An apparatus comprising:
    a circuit for receiving first and second data streams of data at first and second data rates, respectively, wherein the first and second data rates are distinct;
    a circuit for creating first and second data words of N bits from data of the first and second data streams, respectively;
    a circuit for transmitting a plurality of the first data words at time intervals I-1;
    a circuit for transmitting a plurality of the second data words at time intervals I-2;
    wherein time interval I-1 is greater than time interval I-2;
    wherein the circuit for transmitting is configured to transmit at least one of the first data words over an optical cable between transmission of a pair of the second data words;
    wherein the circuit for transmitting is configured to transmit at least one of the second data words over the optical cable between transmission of a pair of the first data words.

8. The apparatus of claim 7 wherein the first and second data streams are received from first and second devices, respectively, that transmit the first and second data streams in accordance with first and second protocols, respectively, wherein the first and second protocols are distinct.

9. The apparatus of claim 7 further comprising a circuit for mapping N bits of the first data stream to M bits using an encoder, and a circuit for transmitting the M bits via the optical cable as one of the first data words.

10. A non-transitory memory storing processor executable instructions, wherein a method is implemented in response to executing the instructions, the method comprising:
    receiving first and second data streams of data at first and second data rates, wherein the first and second data rates are different from each other;
    creating first and second data words from data of the first and second data streams, respectively;

transmitting a plurality of the first data words at time intervals I-1;
transmitting a plurality of the second data words at time intervals I-2;
wherein time interval I-1 is greater than time interval I-2;
wherein at least one of the first data words is transmitted via an optical cable between transmission of a pair of the second data words via the optical cable, and;
wherein at least one of the second data words is transmitted via the optical cable between transmission of a pair of the first data words via the optical cable.

11. The non-transitory memory of claim 10 wherein the method further comprises:
while transmitting the first and second data words via the optical cable;
receiving a third data stream of data;
creating third data words from data of the third data stream;
transmitting the third data words via the optical cable;
wherein at least one of the third data words is transmitted via the optical cable between transmission of another pair of the first data words, and;
wherein at least one of the first data words is transmitted via the optical cable between transmission of a pair of the third words.

12. The non-transitory memory of claim 11 wherein the third data stream is received at the second data rate.

13. The non-transitory memory of claim 10 wherein the first and second data streams are received from first and second devices, respectively, that transmit the first and second data streams in accordance with first and second protocols, respectively, wherein the first and second protocols are distinct.

14. The non-transitory memory of claim 10 wherein the method further comprises mapping N bits of the first data stream to M bits using an encoder, and transmitting the M bits via the optical cable as one of the first data words.

* * * * *